(No Model.) 2 Sheets—Sheet 1.

J. McINTYRE.
PIPE FITTING.

No. 503,432. Patented Aug. 15, 1893.

WITNESSES:
Chas. Nida.
C. Sedgwick.

INVENTOR
J. McIntyre
BY
Munn & Co.
ATTORNEYS.

(No Model.) J. McINTYRE. 2 Sheets—Sheet 2.
PIPE FITTING.

No. 503,432. Patented Aug. 15, 1893.

WITNESSES:
Chas Nider.
C. Sedgwick

INVENTOR
J. McIntyre
BY
Munn & Co
ATTORNEYS.

UNITED STATES PATENT OFFICE.

JOHN McINTYRE, OF JERSEY CITY, NEW JERSEY.

PIPE-FITTING.

SPECIFICATION forming part of Letters Patent No. 503,432, dated August 15, 1893.

Application filed October 15, 1892. Serial No. 448,943. (No model.)

*To all whom it may concern:*

Be it known that I, JOHN MCINTYRE, of Jersey City, in the county of Hudson and State of New Jersey, have invented a new and Improved Pipe-Fitting, of which the following is a full, clear, and exact description.

The object of the invention is to provide a new and improved pipe fitting, which is simple and durable in construction, very effective in operation, and arranged to securely connect the pipes with each other without danger of leakage at the joints or through sand holes or other defects in the castings.

The invention consists of a pipe fitting provided with an annular recess from which extend branch openings to the pipe sections, and a nut screwing in the said recess to press the packing material contained therein through the branch openings into the pipe sections.

The invention further consists of a metallic packing formed by concentric rings connected with each other by branch arms.

The invention also consists of certain parts and details, and combinations of the same, as will be hereinafter described and then pointed out in the claims.

Reference is to be had to the accompanying drawings forming a part of this specification, in which similar letters of reference indicate corresponding parts in all the figures.

Figure 1:
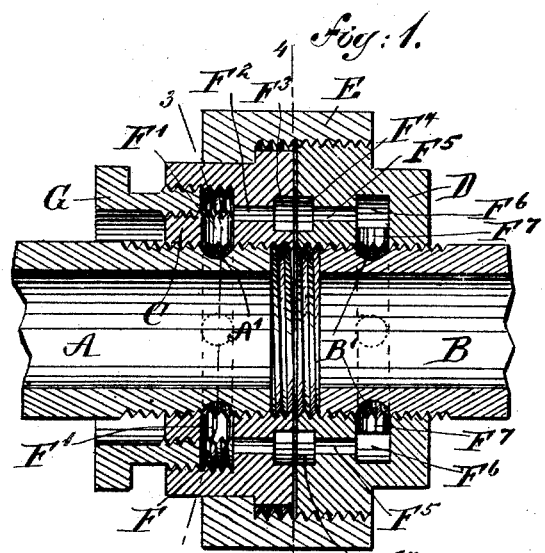
Figure 2:
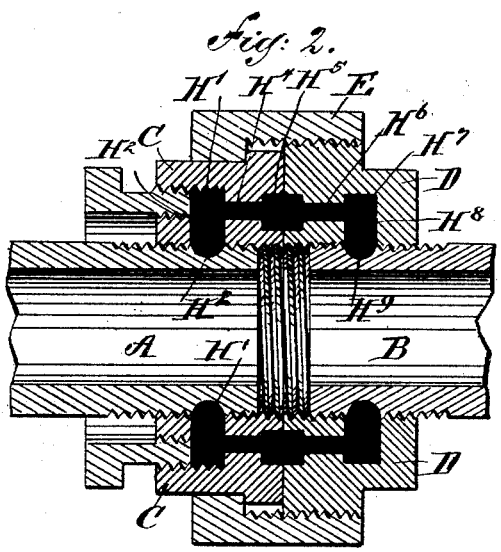
Figure 3:
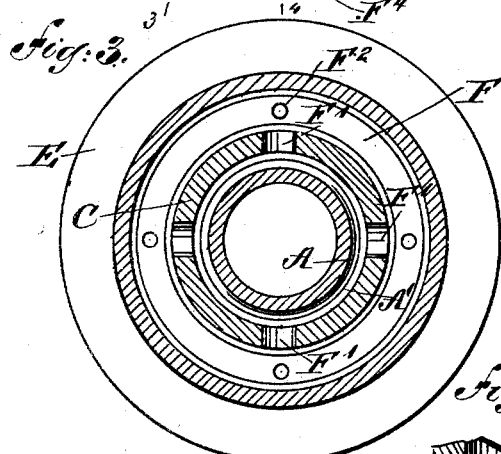
Figure 4:
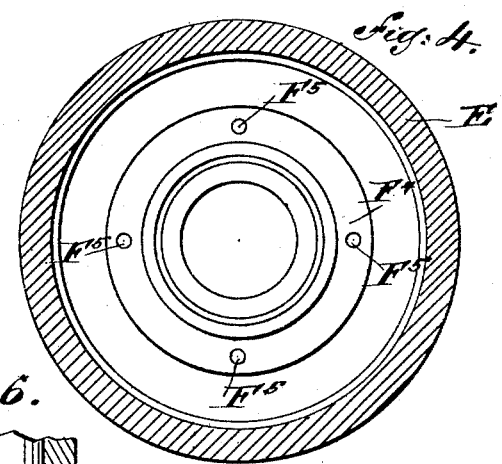
Figure 6:
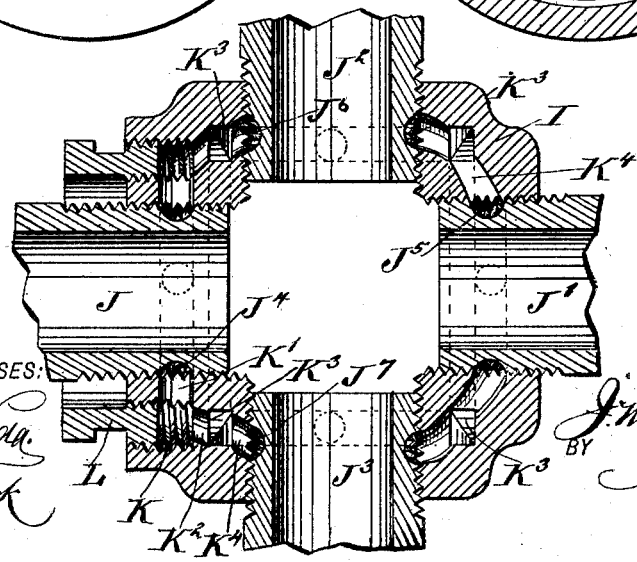
Figure 5:
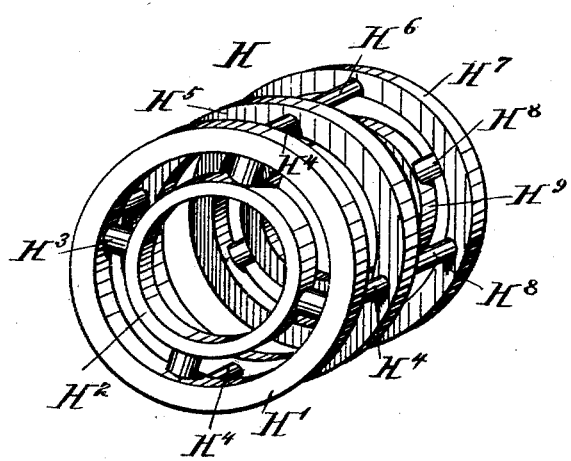

Figure 1 is a sectional side elevation of the improvement with the packing removed, and as arranged on a pipe coupling. Fig. 2 is a sectional side elevation of the improvement with the packing in position. Fig. 3 is a transverse section of the same on the line 3—3 of Fig. 1. Fig. 4 is a like view of the same on the line 4—4 of Fig. 1. Fig. 5 is a perspective view of the packing; and Fig. 6 is a sectional side elevation of a modified form of the improvement.

The pipes A and B connected with each other—by a pipe coupling, preferably of the construction shown—are formed with exterior screw threads on which screw the coupling members C and D formed with external screw threads engaged by a coupling nut E to hold the two members together, as plainly shown in Figs. 1 and 2. In the coupling member C and in the outer face of the same is formed an annular recess F formed with a screw thread at its two concentric walls, the said screw threads being engaged by an annular nut G concentric to the pipe A and adapted to screw in the recess F for the purpose of pressing the packing, as hereinafter more fully described. From the inner end of the annular recess F lead branch openings F', formed radially and inwardly to connect with an annular recess A' formed on the threaded end of the pipe A. Now, it will be seen that when a metallic packing material such as lead for instance, is poured into the recess F, and the nut G is screwed up then the metallic packing material H is pressed through the openings F' into the annular recess A' formed in the pipe A.

In order to form a tight joint between the coupling members C and D and also a tight joint between the latter and its pipe B I proceed as follows: The annular recess F is connected by longitudinally-extending branch openings $F^2$ with an annular recess $F^3$ formed in the inner face of the coupling section C. This recess registers with a similar recess $F^4$ formed in the inner face of the other coupling member D, and this recess $F^4$ is connected by longitudinally-extending branch openings $F^5$ with an annular recess $F^6$ formed in the coupling member D. From this annular recess $F^6$ lead radial branch openings $F^7$ to an annular recess B' formed in the threaded end of the pipe B. Now, it will be seen that when the recesses and openings formed in the members C and D are filled with lead or other suitable packing and the nut G is screwed up in the recess F, then the pressure is exerted against the packing to force the latter tightly in contact with the pipes A and B at the recesses A' and B', and at the same time the material forms a ring connecting the members C and D with each other at their adjacent inner faces, so that all leakage is positively prevented, either at the joint of the members or through the screw threads between the pipes A and B and their coupling members C and D. In case an acid is passed through the pipes and part of the threads in the pipes A, B, and the members C, D, should be injured by being eaten away by the acid, then the lead packing in the recesses A' and B' still prevents escape of the acid and in fact can be forced into the eaten away parts by screwing up the nut G. Thus, it will be seen that by this arrangement all leakage is positively prevented and any wear on the parts can be taken up by adjusting the nut G, which latter presses the packing material tightly in contact with the several coupling surfaces.

As illustrated in Fig. 5, the packing H if detached from the coupling, will comprise two concentric rings H' and H² connected with each other by branch arms H³, the outer concentric ring H' being connected by longitudinal branch arms H⁴ with a ring H⁵ from which extend longitudinally-connecting arms H⁶ which carry a ring H⁷ connected by radial branch arms H⁸ with a ring H⁹ concentric to the ring H⁷. As illustrated in Fig. 2, the several rings and arms are in the recesses and openings in the pipes A, B, and coupling members C, D, above described. It will be seen that the lead packing forms a band or ring H⁵ in the pipe fitting at the junction of the two pipes, so as to prevent escape of the fluid through sand-holes or other defects in the casting of the coupling or other fitting.

In the modified form shown in Fig. 6, four pipes J, J', J² and J³ are screwed into a single coupling body I, formed with a threaded recess K concentric to the pipe J on which screws the nut L for pressing the packing material into the various recesses and openings presently to be described. The threaded recess K is connected by branch openings K' with an annular recess J⁴ formed in the threaded part of the pipe J. The recess K is also connected by longitudinally-extending branch openings K² with a recess K³ formed by four annular channels connected with each other, as illustrated in the said figure, and arranged concentric to the pipes J, J', J² and J³ in the body I. From this channel K³ lead branch openings K⁴ to annular recesses J⁵, J⁶ and J⁷ in the pipes J', J² and J³ respectively. Now, it will be seen that when a packing material is poured into the several recesses, openings and channels, and the nut L is screwed up against the packing material in the annular recess K, then the packing material is firmly pressed into the annular recesses J⁴, J⁵, J⁶ and J⁷ in the several pipes J, J', J² and J³ respectively, leading into the coupling body I.

Having thus fully described my invention, I claim as new and desire to secure by Letters Patent—

1. A pipe fitting comprising a coupling member formed with an annular recess and branch openings leading from the said recess to the pipe section, a packing ring held in the said annular recess and having branch arms extending through the said branch openings to the pipe section, substantially as shown and described.

2. A pipe fitting comprising a coupling member formed with an annular recess and branch openings leading from the said recess to the pipe section, a packing ring held in the said annular recess and having branch arms extending through the said branch openings to the pipe section, and means, substantially as described, for compressing the said packing ring and its branch arms to force the latter into firm contact with the pipe section, substantially as described.

3. A pipe fitting comprising a coupling member formed with an annular recess and branch openings leading from the said recess to the pipe section, a packing ring held in the said annular recess and having branch arms extending through the said branch openings to the pipe section, and a nut having an interior and exterior screw thread engaging the threaded concentric walls of the said annular recess to screw in the said coupling member to compress the said packing ring and its branch arms, substantially as described.

4. A pipe fitting comprising a coupling member, a metallic packing arranged in the said coupling member and comprising the two concentric rings and radial branch arms connecting the two rings with each other and means for compressing the outermost of the said concentric rings to force the innermost ring into contact with the pipe section, substantially as shown and described.

5. The combination with the pipes provided on their ends with exterior annular recesses, of a pipe fitting engaging the adjacent ends of the said pipes and comprising coupling members having connected annular recesses connected by branch openings with the said annular recesses of the said pipes, a packing engaging the said connected recesses, and the branch openings and pipe recesses and means for compressing the said packing, substantially as shown and described.

6. A pipe fitting provided with annular recesses connected with each other, and from which extend branch openings leading to the pipes, substantially as shown and described.

7. A pipe fitting provided with annular recesses connected with each other, and connected with annular recesses in the pipes, a packing material held in the said recesses, and a nut screwing in one of the said recesses to compress the said packing, substantially as shown and described.

8. A pipe fitting comprising coupling members screwing on the threaded ends of the pipes, and each formed with annular recesses, longitudinal openings connecting the recesses with each other, and radial openings leading from the outermost recess to recesses in the pipes, substantially as shown and described.

9. A pipe fitting comprising coupling members screwing on the threaded ends of the pipes, and each formed with annular recesses, longitudinal openings connecting the recesses with each other, radial openings leading from the outermost recess to recesses in the pipes, and a nut screwing in the outermost recess of one of the coupling members, substantially as shown and described.

10. A pipe coupling, comprising two coupling members formed at their adjacent faces with registering annular recesses, a packing material held in the said registering recesses, and a nut screwing in one of the said members for compressing the said packing material, substantially as shown and described.

11. A pipe coupling comprising a body formed with an annular threaded recess from which lead branch openings to a recess in one of the pipes screwing on the said body, a channel formed in the said body by a number of connected annular recesses of which one is connected by branch openings with the first named threaded recess, the said channel being also connected by branch openings with a recess in the other pipes screwing in the said body, and a nut screwing in the first named threaded recess to compress the packing material contained in the several recesses, channels and openings in the body, substantially as shown and described.

JOHN McINTYRE.

Witnesses:
    THEO. G. HOSTER,
    C. SEDGWICK.